United States Patent [19]

Schoen, Jr.

[11] 3,832,882
[45] Sept. 3, 1974

[54] HUMIDITY TESTING APPARATUS
[75] Inventor: Oscar W. Schoen, Jr., Fort Lauderdale, Fla.
[73] Assignee: The United States of America as represented by the Secretary of the Navy, Washington, D.C.
[22] Filed: May 10, 1973
[21] Appl. No.: 359,066

[52] U.S. Cl. .................................... 73/1 R, 73/336
[51] Int. Cl. ............................................. G01w 1/18
[58] Field of Search ....... 73/1 R, 29, 335, 336, 64.2

[56] References Cited
UNITED STATES PATENTS
3,532,270   10/1970   Schoen .................................. 73/29

OTHER PUBLICATIONS
Gregory and Rourke; "Hygrometry," 1957, pages 53–60, and appendix III, pages 247–248.

Primary Examiner—Richard C. Queisser
Assistant Examiner—Denis E. Corr
Attorney, Agent, or Firm—R. S. Sciascia; P. N. Critchlow

[57] ABSTRACT

The atmospheres of a salt chamber and a test chamber are transported in a closed-loop back and forth between the chambers, the loop including heating and cooling means for adding and subtracting equal temperature increments as the atmospheres are in transit between the chambers. The salt chamber remains at a constant temperature to maintain a stabilized relative humidity. Heat added to the stablized atmosphere as it passes to the test chamber is subtracted during the return flow. The relative humidity of the test chamber varies with the heat increments to permit RH sensors and the like to be calibrated.

5 Claims, 3 Drawing Figures

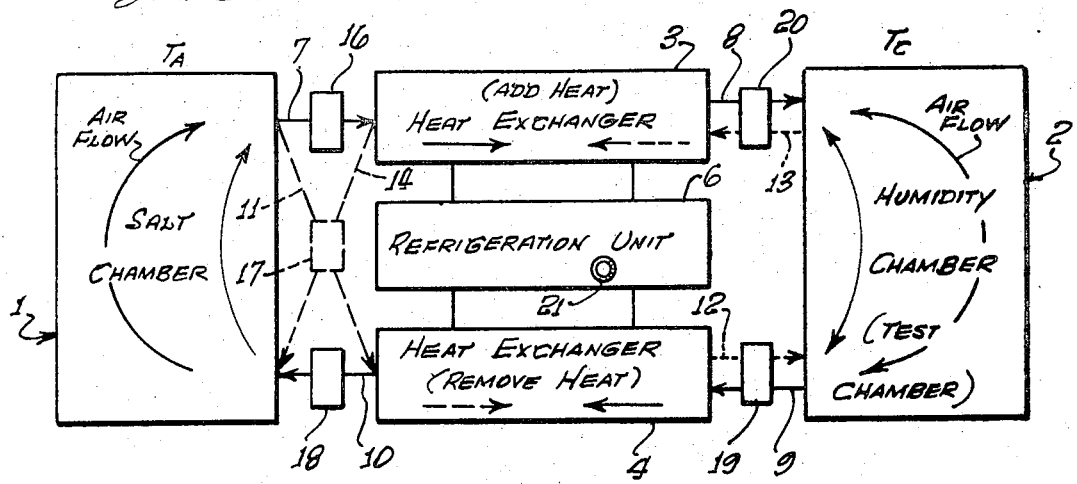
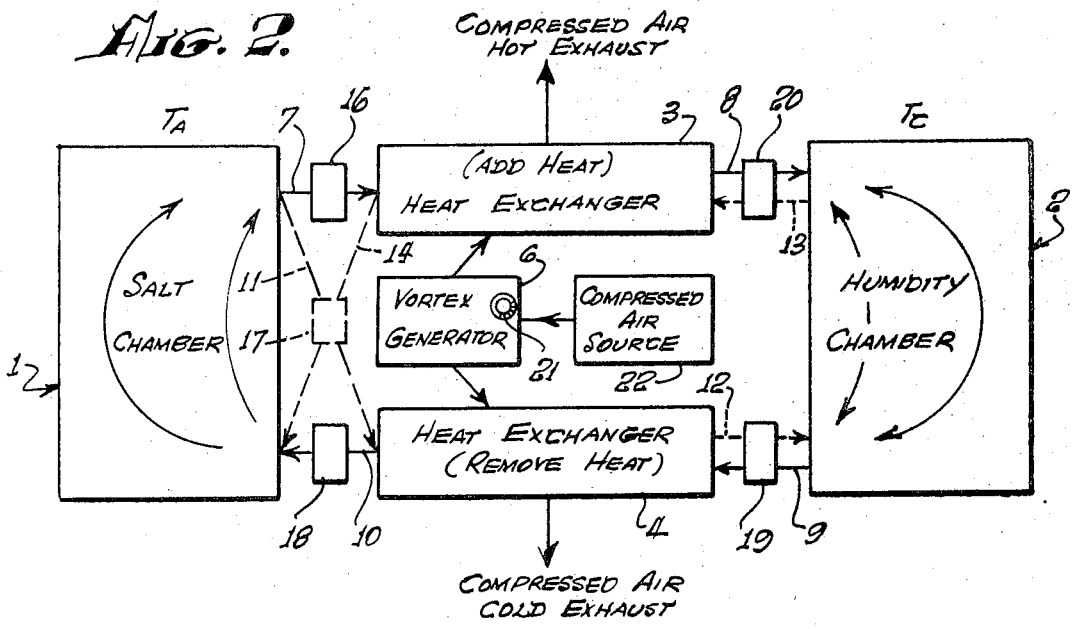

HUMIDITY TESTING APPARATUS

BACKGROUND OF THE INVENTION

The invention relates to test chambers for calibrating test instruments, such as relative humidity sensors, and, in particular, to closed-loop systems for controlling the relative humidity of the test chamber.

Relative humidity sensors and other related test instruments customarily are calibrated in a humidity test chamber having a known and controllable relative humidity. Different techniques presently are used for creating the desired relative humidity, one of these being based upon the assumption that somewhere in the system the air to be directed into the test chamber has been completely saturated with moisture. However, this assumption is not valid since it is extremely difficult to realize complete air saturation. Other techniques or methods which do not rely upon complete saturation include a partial pressure method in which the combination of air and water vapor depends upon their respective partial pressures. Such a method is disclosed in U. S. Pat. No. 3,532,270 issued Oct. 6, 1970 to the present inventor, O. W. Schoen, Jr., this method employing an open-type system in which the outside air is drawn in, moisture added and the air then directed into a test chamber from which it is exhausted into the outside air.

Another calibration method not relying upon complete saturation is what is known as a 'Salt Chamber' method in which the relative humidity is determined by a stabilized water vapor pressure existing at the surface of a saturated salt solution. The stabilized atmosphere of the salt chamber is directed into the humidity chamber and then recirculated back to the salt chamber, this recirculation being performed continuously to permit the humidity chamber to establish the same relative humidity as the stabilized water vapor pressure of the saturated salt solution. Such a saturated salt solution method is effective, but, as a practical matter, it has at least one serious limitation. Thus, since the relative humidity depends on the particular salt solution being used only one relative humidity value can be established in the humidity test chamber for each saturated salt solution. Obviously, such a limitation can be overcome by changing the salt solution but, when such is attempted the time element for the tests becomes significant since approximately 1 hour is required to stabilize each new solution at its relative humidity level. Another expedient intended to provide different relative humidities in the humidity test chamber is to employ several salt chambers adapted to be coupled one at a time to the humidity test chamber. Again, however, such an expedient requires a good deal of time and further, for reasons that will become clearer, the relative humidity control of the test chamber atmosphere lacks flexibility to the extent that each salt solution stabilizes at a particular relative humidity and the spread between these relative humidity values may be such that it is not compatible with the calibration of particular sensors.

It is therefore a principle object of the present invention to provide a closed-loop system for calibrating test instruments, the system utilizing a saturatued solution, such as the previously discussed saturated salt solutions, and, further, having a capability of establishing a wide and continuous range of relative humidity values so as to provide a flexibility permitting almost any desired relative humidity value to be so established.

Another object is to utilize heating and cooling sources to achieve the desired relative humidity and to utilize these sources in a particular manner that is independent of electrical power supplies and other power sources which tend to provide undesirable sources of extraneous heat.

These and other objects of the invention are achieved by utilizing a constant-temperature solution chamber containing a saturated water solution, such as a salt solution, the chamber atmosphere above the surface of the solution being stabilized at a known relative humidity substantially less than 100 percent. A conventional calibration test chamber is coupled in a closed-loop with the solution chamber so as to permit the atmospheres of both chambers to circulate back and forth. To establish a particular desired relative humidity value in the test chamber, heat is added to or subtracted from the stabilized atmosphere of the solution chamber as it passes from that chamber to the test chamber. The relative humidity of the test chamber varies in proportion to the amount of heat added to or subtracted from the source atmosphere. Further, to maintain the fixed value of the relative humidity of the source atmosphere in the solution chamber, the return flow of the atmosphere from the test chamber to the solution chamber is either cooled or heated by an amount equal to the amount or increment previously added or subtracted. Operatively considered, a relative humidity generator of this type permits generation of almost continuous relative humidities from a few percent RH to near 100 percent RH, although, as will be pointed out, the dew point may impose a limitation on this range. The generation of any RH value can be intelligently predetermined using available thermodynamic and psychrometric relationships.

BRIEF DESCRIPTION OF THE DRAWINGS

The present invention is illustrated in the accompanying drawings of which:

FIGS. 1 and 2 both are block diagrams illustrating differing embodiments of the present closed-loop system, the embodiments differing only in their use of different types of heat sources for producing the required heating and cooling increments.

DETAILED DESCRIPTION OF THE INVENTION

Figure 3:
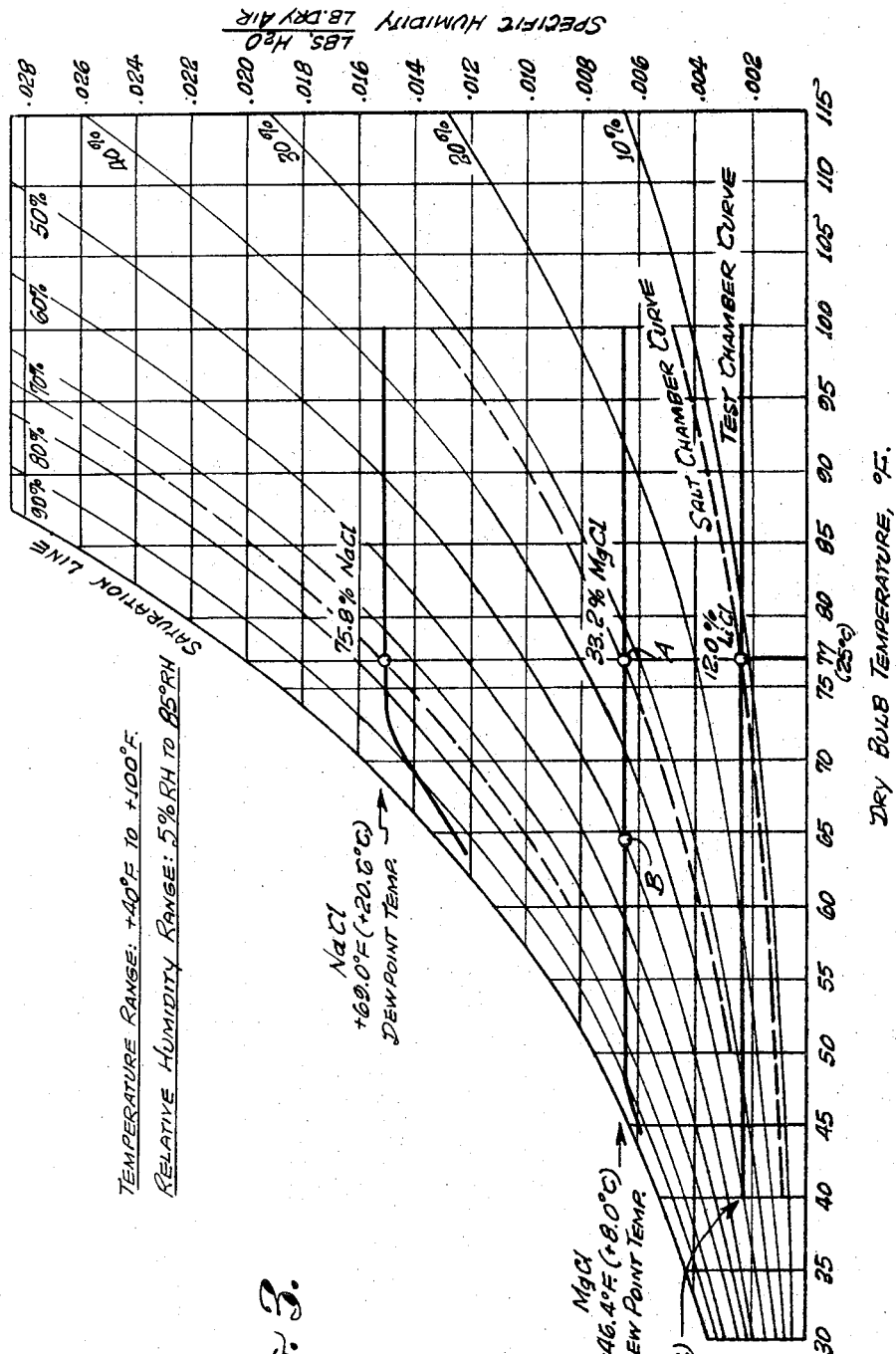
FIG. 3 is a psychrometric chart showing a number of humidity curves for three of the salts used in the present salt chamber.

Referring to FIG. 1, the illustrated components include a salt chamber 1, a humidity test chamber 2, a pair of heat exchangers 3 and 4 and a heating and cooling source, such as the illustrated refrigeration unit 6. Salt chamber 1 is a humidity generator chamber partially filled with a particular saturated salt solution which will be discussed in greater detail, the solution having its atmosphere disposed above its surface stabilized at a known relative humidity. Similarly, chamber 2 is a closed-container in which test instruments, such as relative humidity sensors can be mounted for calibration purposes.

These two chambers, as well as the other components that have been identified, all are included in a closed-loop system by employing a number of conduits identifiable in the drawings by the arrowed, solid and dotted lines. The closed-loop is provided to permit the circulation of the air or atmosphere of chamber 1 through either heat exchanger 3 or 4 to humidity chamber 2 and to also permit the recirculation of the atmosphere from the humidity chamber through these heat exchangers back into solution chamber 1. The arrowed, solid line 7, 8, 9 and 10 conduct the atmosphere first through heat exchanger 3 into the test chamber and then back through the heat exchanger 4 to solution chamber 1. Similarly the arrowed, dotted lines 11, 12, 13 and 14 cycle the atmosphere of chamber 2 first through heat exchanger 4, the return flow being through heat exchanger 3. Appropriate valving schematically identified by blocks 16, 17, 18, 19 and 20 permits a manual selection of either of the loops or circulation cycles.

At this point, it perhaps should be noted that all of the components used in the present system either are standard, conventional units readily available from commercial sources, or, as in the case of chambers 1 and 2, the units simply may be box containers formed of operationally compatible material and designed to suit the particular function for which they are employed. When a salt solution is used in chamber 1, it should be quite shallow to permit the salt solution to be "slushy" in nature. As a consequence, the height of the salt chamber can be substantially less than that of the humidity chamber. For example, the salt chamber might have a 3 feet height with its other dimensions about 20 feet by 8 feet, whereas the humidity chamber has a height of about 15 feet. Also, since the contents of both chambers must be changed, they obviously will be formed with the access covers which are capable of being fastened into a closed position so as to eliminate any air leaks. The various conduits which also are a part of the closed-loop system, most suitably are provided by a flexible tubing and again, the various couplings for the tubing should be air tight. The elimination of any air leaks is a critical consideration, although, as will be appreciated, the presence of air leaks readily can be detected and corrected since these leaks will result in a loss of salt solution saturation properties. An experienced operator can detect these losses by using a relative humidity monitor although visual indications usually are adequate.

Temperature conditions of both the salt chamber and the humidity chamber also are operationally critical to the extent that the solution and atmosphere of the salt chamber should be maintained at a constant temperature so as to provide a known relative humidity as the source humidity for the test chamber. Also, the interior temperature of the humidity chamber should be constant, except for the addition or subtraction of heat to the atmosphere as it passes through the closed-loop. For most purposes, both of the chambers can be maintained at ambient temperature conditions and slight variations in these conditions should not appreciably effect the accuracy of the calibration tests being conducted. If desired, insulation can be employed to minimize variations and also to minimize heat loss through the chamber walls. If the chambers are formed of a plastic or other similar material and if the walls are sufficiently thick, there will be little loss.

Heat exchangers 3 and 4 as well as refrigeration unit 6 can be commercially available units. However, for purposes which will be discussed, the units should be of a type which assures maximum accuracy in the particular amount of heat added or subtracted. In other words, it is desirable that a precisely equal amount of heat be subtracted from heat exchanger 4 as is added to heat exchanger 3 or vice-versa. Further, the amounts themselves should be controllable and the need for this control is indicated by knob 21 shown on refrigeration unit 6.

FIG. 2 shows essentially the same components as those identified with respect to FIG. 1 and the conduits for circulating the atmospheres also are the same. The single difference in FIG. 2 is its use of what is known as a vortex generator. The function of these generators is to convert the potential energy of compressed air into heat energy and they are so designed that one stream of air from the generator has a temperature higher than the supplied air temperature, while another stream has a lower temperature. A bottled compressed air source such as source 22 provides the supplied air and the principle advantage of such an arrangement is the fact that it eliminates the use of electrical power sources such as are needed for the refrigeration unit. It is contemplated that use of the vortex generator will provide the precise heating and cooling increments needed for precision operation of the present system.

The present system uses a saturated solution, such as a salt solution, to establish a stabilized atmosphere at a particular, known relative humidity. This stabilized atmosphere then is used as a source atmosphere for the test chamber. A feature of the system is that the established and known relative humidity is varied a known amount in transit from the salt chamber to the test chamber. The known variations in turn, are produced by the addition or subtraction of a particular increment of heat. Of equal importance, the stabilized atmosphere of the salt chamber is, at all times, maintained by assuring that the atmosphere returning back to the salt chamber is at the same temperature and relative humidity as that prevailing in the salt chamber.

To better understand the theory of operation of the present system it may be well to briefly consider some of the basic principles applicable to relative humidity and water vapor pressures. Thus, as is well known, the saturation level, or vapor partial pressure, above a surface of liquid such as water is determined by the difference in the rate at which water molecules leave the surface (rate of evaporation) compared to the rate at which they return (rate of condensation), and the temperature at which this occurs. As the temperature is raised in a closed system at constant total pressure both of these rates will increase and eventually will equalize to the same value. Also, the total amount of water molecules in the vapor phase will increase according to the applicable thermodynamic laws. The result at equilibrium is a net increase in the water vapor partial pressure. The relative humidity, however, remains constant at 100 percent since, by definition this is the actual water vapor partial pressure of an air sample compared to the saturated water vapor partial pressure at the given temperature under consideration.

However, if the salt chamber temperature is allowed to stabilize at a constant level and the normal evaporation rate is adjusted to a value less than that dictated by the temperature of the water, the water vapor partial pressure will be less than that of the saturated conditions mentioned above. In this manner the relative humidity can be reduced below 100 percent. In the present closed-loop system, adjustment of the evaporation rate preferably is accomplished by dissolving any one of several acceptable salts in liquid water so that some of the surface water molecules are replaced by salt particles or ions. That part of the area of the solution surface which consists of salt ions prohibits the transport of water molecules from the liquid to the vapor phase but does not prohibit the condensation of water vapor. Since the condensation rate tends to remain constant regardless of the character of the solution surface, control of relative humidity is effected by controlling the proportion of salt ions at the surface of the salt-water solution at equilibrium, the condensation rate again being equal to the evaporation rate but, as a consequence of the reduced free water surface area, both rates then are less than the normal for the water temperature. The result is a smaller fraction of water molecules in the vapor phase than is normal, with a consequent reduction in vapor partial pressure and relative humidity. The relative humidity of the atmosphere of the salt solution is less 100 percent so that it can be varied by adding or subtracting heat which changes the relative humidity according to the air-water vapor thermodynamic and psychrometric relationships. Against this background, it will be appreciated that a certain amount of heat added to the stabilized atmosphere being circulated from the salt chamber to the humidity chamber will produce a certain relative humidity in the humidity chamber so that the relative humidity of chamber 2 can be varied in accordance with the amount of heat so added. Similar variations in control of the humidity chamber relative humidity can be achieved by reducing the temperature of the stabilized atmosphere as it proceeds to the humidity chamber and, of course, this reduction can be accomplished in heat exchanger 4. Return of the atmosphere to the salt chamber adds or subracts an equal but opposite increment of heat so as to maintain the prevailing conditions in the salt chamber. The previously mentioned valving permits the selection of one or the other of the loops.

There are a number of solutions which can be used in chamber 1, some of these being a mixture of an acid and water, a salt mixture solution or a pure salt solution. Pure salt solutions are easiest to use, since these solutions are better known in terms of relative humidity properties. A number of these solutions are identified in a National Bureau of Standards research paper 2512, volume 53, number 1, July 1954. Of the salts mentioned in this paper, three are considered well suited for use with the present system, these three being lithium chloride (Licl-$H_2O$), magnesium chloride ($MgCl_2 \cdot 6H_2O$) and sodium chloride (NaCl). These particular salt solutions come close to being ideal salts since they demonstrate substantial independence of relative humidity with temperature. For example, magnesium chloride at 77°F (25°C) has relative humidity of 33.2 percent and as shown in FIG. 3, this value remains substantially constant with variations of temperature in either direction.

In preparing the salt solution for use in chamber 1 it preferably is made up as a 'slushy' mixture with distilled water and chemically pure salt of, at least, reagent grade. A slushy mixture, as defined herein, is one in which there is neither dry salt nor puddles of free liquid exposed to the air. One method of preparing the mixture so as to have the proper consistency is to break or grind the salt in a clean container eliminating all lumps. The salt chamber then is placed on a level surface and clean distilled water poured into it to attain a depth of approximately one-fourth foot. The comminuted salt then is distributed in sufficient quantity evenly over the surface of the water until the mixture achieves the consistency described above; i.e., it has neither dry salt nor puddles of dry liquid exposed to the air. Vibrating or lightly shaking the salt chamber during the distribution of the salt will help produce an even consistency in the final mixture. As can be appreciated, the presence of areas of dry salt or of relatively large puddles of water can vary the evaporation and condensation of the water vapor so as to introduce some error into the desired calibrations.

After the salt solutions have been prepared and the instruments to be calibrated placed in position, the chamber covers are carefully fastened into position so as to avoid air leaks and the flexible tubing serving as conduits connected. A blower customarily will be used to circulate the atmosphere between the chambers and through the heat exchangers although, after the blower is turned on, a period of time should be alloted for the atmospheres to stabilize at the desired relative humidity level. When a different relative humidity is needed for the calibration tests, this new relative humidity can be achieved by increasing or decreasing the amount of heat added to and subtracted from the in transit atmospheres. Operation also is improved by the use of a baffle in the salt chamber to spread the air movement over a large surface of the saturated salt solutuion so as to result in optimum stabilization times. Another suggestion which will improve the calibration is to mount the instruments to be calibrated in the center of humidity chamber since the air movement in the corners of the humidity chamber is not as well distributed and therefore the moisture equalization is not as rapid as it is near the center of the chamber.

A specific calibration test can be followed using the data provided by the Psychrometric Chart (FIG. 3). Assuming that solution chamber 1 contains a saturated salt solution of magnesium chloride and the chamber has a constant temperature of 77°F, normal operation of the system without the addition or subtraction of any heat increment would result in establishing a relative humidity of 33.2 percent in humidity chamber 2, providing, of course, that humidity chamber 2 also is maintained at a constant temperature of 77°F which can be considered an ambient temperature condition. This normal operation would occur if the temperature remains at 77°F which has a point A on the flat percent RH curve of this salt. If another calibration point for the relative humidity sensor is desired, the stabilized salt solution atmosphere from chamber 1 can be cooled by passing it through heat exchanger 4 into test chamber 2 and then back to chamber 1 through heat exchanger 3. In heat exchanger 4, the in transit atmosphere is cooled from point A to point B or from 77°F to 65°F which, as will be seen, is on a relative humidity curve of 50 percent. Thus, the relative humidity in the test chamber is changed from 33.2 percent to 50 percent. If it is desired to lower the relative humidity in chamber 2, the in transit atmosphere first can be heated in heat exchanger 3 by any desired amount. As shown by the $MgCl_2$ curve of FIG. 3 this salt behaves as an ideal salt from approximately its dew point 46.4° to 100°F so that its relative humidity can be varied within a range of about 90 percent relative humidity to around 10 percent. Other salts can extend this range or mixtures of salts can be used if a greater range is desired. Data such as the psychrometric chart of FIG. 3 is useful to permit the temperature control needed to establish the desired variation in the test chamber humidity.

In general, the present system is especially advantageous in that it permits the generation of known humidity atmospheres which can be used in the calibration tests and, in contrast to prior closed-loop systems, it provides a variable humidity test chamber. Further, the system can be provided by using commercially available components which are relatively simple, low cost, easily maintained. In operation, accuracy is achieved that is well below the accuracy required for the relative humidity sensors and, further, the accuracy is equal to the more expensive commercial devices which have been used for these purposes.

Obviously many modifications and variations of the present invention are possible in the light of the above teachings. It is therefore to be understood that within the scope of the appended claims the invention may be practiced otherwise than as specifically described.

I claim:

1. A closed-loop system for calibrating test instruments in an atmosphere having a controllably-variable relative humidity comprising:
   a test chamber having an atmosphere in which said instruments are exposed for testing,
   a constant-temperature solution chamber containing a saturated water solution and an atmosphere having its vapor partial pressure stabilized at said temperature and at a known relative humidity substantially less than 100 percent,
   a separate means for transporting the atmosphere of each one of the chambers to the other chamber, said means sealably intercommunicating said chambers for providing said closed-loop, and
   controllable temperature means associated with each of said separate transporting means for simultaneously varying the temperatures of the in transit atmospheres by equal and opposite amounts whereby the temperature of said test chamber atmosphere can be varied for controllably varying its relative humidity, the temperature of said solution chamber remaining constant for maintaining said known relative humidity.

2. The closed-loop system of claim 1 wherein said solution is a slushy saturated salt solution.

3. The closed-loop system of claim 2 wherein said salt solution is selected from a group consisting of lithium chloride, magnesium chloride and sodium chloride.

4. The closed-loop system of claim 1 wherein said separate transporting means are conduits and said temperature means are heat exchangers disposed one in each of said conduits.
   said system further including cooling and heating means for said heat exchangers.

5. The closed-loop system of claim 4 wherein said cooling and heating means is provided by a vortex generator.

* * * * *